(12) United States Patent
Shiraishi

(10) Patent No.: US 6,909,995 B2
(45) Date of Patent: Jun. 21, 2005

(54) REMOTE SITE MANAGEMENT SYSTEM

(75) Inventor: Toshihito Shiraishi, Tokyo (JP)

(73) Assignee: GE Medical Systems Global Technology Company LLC, Waukesha, WI (US)

(*) Notice: Subject to any disclaimer, the term of this patent is extended or adjusted under 35 U.S.C. 154(b) by 161 days.

(21) Appl. No.: 10/238,421

(22) Filed: Sep. 10, 2002

(65) Prior Publication Data

US 2003/0050792 A1 Mar. 13, 2003

(30) Foreign Application Priority Data

Sep. 11, 2001 (JP) .......................................... 2001-275280

(51) Int. Cl.⁷ ............................. G06F 11/00; G04F 1/00
(52) U.S. Cl. ..................... 702/188; 702/177; 702/184; 340/526
(58) Field of Search ........................... 702/28, 40, 108, 702/116, 176–178, 182–185, 187, 188; 340/500, 526, 527

(56) References Cited

U.S. PATENT DOCUMENTS

| | | | | |
|---|---|---|---|---|
| 4,817,044 A | * | 3/1989 | Ogren .......................... 702/187 |
| 5,216,612 A | * | 6/1993 | Cornett et al. ................. 700/96 |
| 5,522,067 A | * | 5/1996 | Swire ............................ 707/204 |
| 5,845,069 A | * | 12/1998 | Tanaka ......................... 713/200 |
| 5,889,951 A | | 3/1999 | Lombardi ..................... 709/219 |
| 6,015,087 A | | 1/2000 | Seifert et al. ................. 235/379 |
| 6,023,687 A | | 2/2000 | Weatherly et al. ............. 705/38 |
| 6,049,784 A | | 4/2000 | Weatherly et al. ............. 705/38 |
| 6,205,579 B1 | * | 3/2001 | Southgate .................... 717/173 |
| 6,237,009 B1 | | 5/2001 | Waldo et al. ................. 707/206 |
| 6,263,350 B1 | | 7/2001 | Wollrath et al. ............. 707/206 |
| 6,347,302 B1 | | 2/2002 | Joao .............................. 705/4 |
| 6,643,592 B1 | * | 11/2003 | Loman et al. ................. 702/35 |
| 6,675,131 B2 | * | 1/2004 | Hahn ........................... 702/188 |
| 2002/0092006 A1 | * | 7/2002 | Takeo ........................... 717/168 |
| 2002/0128853 A1 | * | 9/2002 | Kikuchi et al. ................ 705/1 |
| 2002/0147601 A1 | * | 10/2002 | Fagan ............................ 705/1 |
| 2003/0033156 A1 | * | 2/2003 | McCall .......................... 705/1 |

* cited by examiner

Primary Examiner—Hal Wachsman
Assistant Examiner—Manuel L. Barbee
(74) Attorney, Agent, or Firm—Carl B. Horton, Esq.; Armstrong Teasdale LLP

(57) ABSTRACT

For the purpose of providing timely and efficient maintenance services even when a system includes machines that are not covered by maintenance services, in a system comprising a center server (202) for customer management and a client terminal (104) owned by a customer, communicatably connected to each other via a network (50), the client terminal (104) stores management information including lease contract information (S2) and issues an event to the center server (202) in accordance with the content of the collected management information (S14). The center server (202) analyzes the content of the event received from the client terminal (104) (S22) and makes a notice of the content of the analyzed event (S24).

16 Claims, 5 Drawing Sheets

REMOTE SITE MANAGEMENT SYSTEM

CROSS REFERENCE TO RELATED APPLICATIONS

This application claims the benefit of Japanese Application No. 2001-275280 filed Sep. 11, 2001.

BACKGROUND OF THE INVENTION

The present invention relates to a remote site monitoring system for monitoring the status of a machine for operating a specialized function, especially that for operating a medical imaging device, by, for example, a server machine connected via a computer network.

A medical imaging system such as a CT scanner or MRI system generally comprises a plurality of machines including an imaging apparatus (gantry apparatus) for imaging a subject, and an operation console for sending instruction signals to the imaging apparatus and producing a medical image based on imaging data transferred from the imaging apparatus. The vendor generally makes a maintenance contract with the customer (e.g., a hospital), and then provides maintenance services.

Recent advances in computer technology and network technology enable maintenance services to be provided via a network connecting a customer site and a vendor site. The maintenance services include an information service for the maintained machines, software replacement and the like.

Marketing formats have diversified in recent years, and accordingly, all of the component machines in a system may not be covered by the vendor's maintenance services. Nevertheless, because effective operation of a system is usually achieved only when the component machines cooperate systematically with one another, the vendor cannot provide timely and efficient maintenance services if it does not have access to information on the component machines that are not covered by the maintenance services.

SUMMARY OF THE INVENTION

It is therefore an object of the present invention is to provide a remote site management system capable of providing timely and efficient maintenance services even when a system includes machines that are not covered by maintenance services.

According to the present invention, there is provided an operation console in a medical imaging system communicatably connected to a center server via a network, characterized in comprising: management information storing means for storing management information including lease contract information of said operation console; and event issuing means for issuing an event to said center server in accordance with the content of said management information.

Preferably, the event issuing means comprises means for deciding from said lease contract information included in said management information whether the remaining lease period is less than a predetermined period, and is configured to issue said event when said remaining lease period is decided to be less than said predetermined period.

Preferably, said event issuing means further comprises at least one of: means for deciding whether the use period of storage means provided in said operation console exceeds a predetermined period; means for deciding whether the available capacity of the storage means provided in said operation console is less than a predetermined amount; means for deciding whether the version of an image producing program installed in said operation console is older than a predetermined version; and means for deciding whether the operation frequency of a CPU provided in said operation console is less than a predetermined value; and is configured to issue said event in accordance with the results of these decisions.

Moreover, according to the present invention, there is provided a method of controlling an operating console in a medical imaging system communicatably connected to a center server via a network, characterized in comprising: a management information storing step for storing management information including lease contract information of said operation console; and an event issuing step for issuing an event to said center server in accordance with the content of said management information.

Furthermore, according to the present invention, there is provided a program for controlling an operation console in a medical imaging system communicatably connected to a center server via a network, characterized in comprising: a program code for a management information storing step for storing management information including lease contract information of said operation console; and a program code for an event issuing step for issuing an event to said center server in accordance with the content of said management information.

Moreover, according to the present invention, there is provided a server apparatus communicatably connected to an operation console in a medical imaging system via a network, characterized in comprising: analyzing means for analyzing management information including lease contract information of said operation console transmitted from said operation console; and notifying means for making a notice of the result of the analysis by said analyzing means.

Furthermore, according to the present invention, there is provided a method of controlling a server apparatus communicatably connected to an operation console in a medical imaging system via a network, characterized in comprising: an analyzing step for analyzing management information including lease contract information of said operation console transmitted from said operation console; and a notifying step for making a notice of the result of the analysis at said analyzing step.

Furthermore, according to the present invention, there is provided a program for controlling a server apparatus communicatably connected to an operation console in a medical imaging system via a network, characterized in comprising: a program code for an analyzing step for analyzing management information including lease contract information of said operation console transmitted from said operation console; and a program code for a notifying step for making a notice of the result of the analysis at said analyzing step.

Moreover, according to the present invention, there is provided a remote site management system comprising a medical imaging system including a gantry apparatus for collecting imaging data of a subject and an operation console for sending instruction signals to said gantry apparatus and producing a medical image based on the imaging data transferred from said gantry apparatus, and a center server communicatably connected to said operation console via a network, characterized in that: said operation console comprises: management information storing means for storing management information including lease contract information of said operation console; and event issuing means for issuing an event to said center server in accordance with the content of said management information, and said center server comprises: analyzing means for analyzing the content of said event received from said operation console; and notifying means for making a notice of the content of said analyzed event.

Furthermore, according to the present invention, there is provided a method of controlling a system comprising a medical imaging system including a gantry apparatus for collecting imaging data of a subject and an operation console for sending instruction signals to said gantry apparatus and producing a medical image based on the imaging data transferred from said gantry apparatus, and a center server communicatably connected to said operation console via a network, characterized in that: said operation console stores management information including lease contract information of said operation console; and issues an event to said center server in accordance with the content of said management information, and said center server analyzes the content of said event received from said operation console; and makes a notice of the content of said analyzed event.

Furthermore, according to the present invention, there is provided a system comprising a center server for customer management and a client terminal owned by a customer, communicatably connected to each other via a network, characterized in that: said client terminal comprises: management information storing means for storing management information including lease contract information of said client terminal; and event issuing means for issuing an event to said center server in accordance with the content of said management information, and said center server comprises: analyzing means for analyzing the content of said event received from said client terminal; and notifying means for making a notice of the content of said analyzed event.

Furthermore, according to the present invention, there is provided a method of controlling a system comprising a center server for customer management and a client terminal owned by a customer, communicatably connected to each other via a network, characterized in that: said client terminal stores management information including lease contract information of said client terminal; and issues an event to said center server in accordance with the content of said management information, and said center server analyzes the content of said event received from said client terminal; and makes a notice of the content of said analyzed event.

Therefore, the present invention can provide a remote site management system capable of providing timely and efficient maintenance services even when a system includes machines that are not covered by maintenance services.

Further objects and advantages of the present invention will be apparent from the following description of the preferred embodiments of the invention as illustrated in the accompanying drawings.

DETAILED DESCRIPTION OF THE INVENTION

An embodiment will now be described in detail with reference to the accompanying drawings. The embodiment describes an X-ray CT system constituting the medical imaging system that is the product to which the embodiment applies, and the vendor that sold the X-ray CT system provides maintenance services to a customer. It will be easily recognized that the X-ray CT system is an exemplary product, and the present invention may be applied to other system products (e.g., an MRI system).

Figure 1:
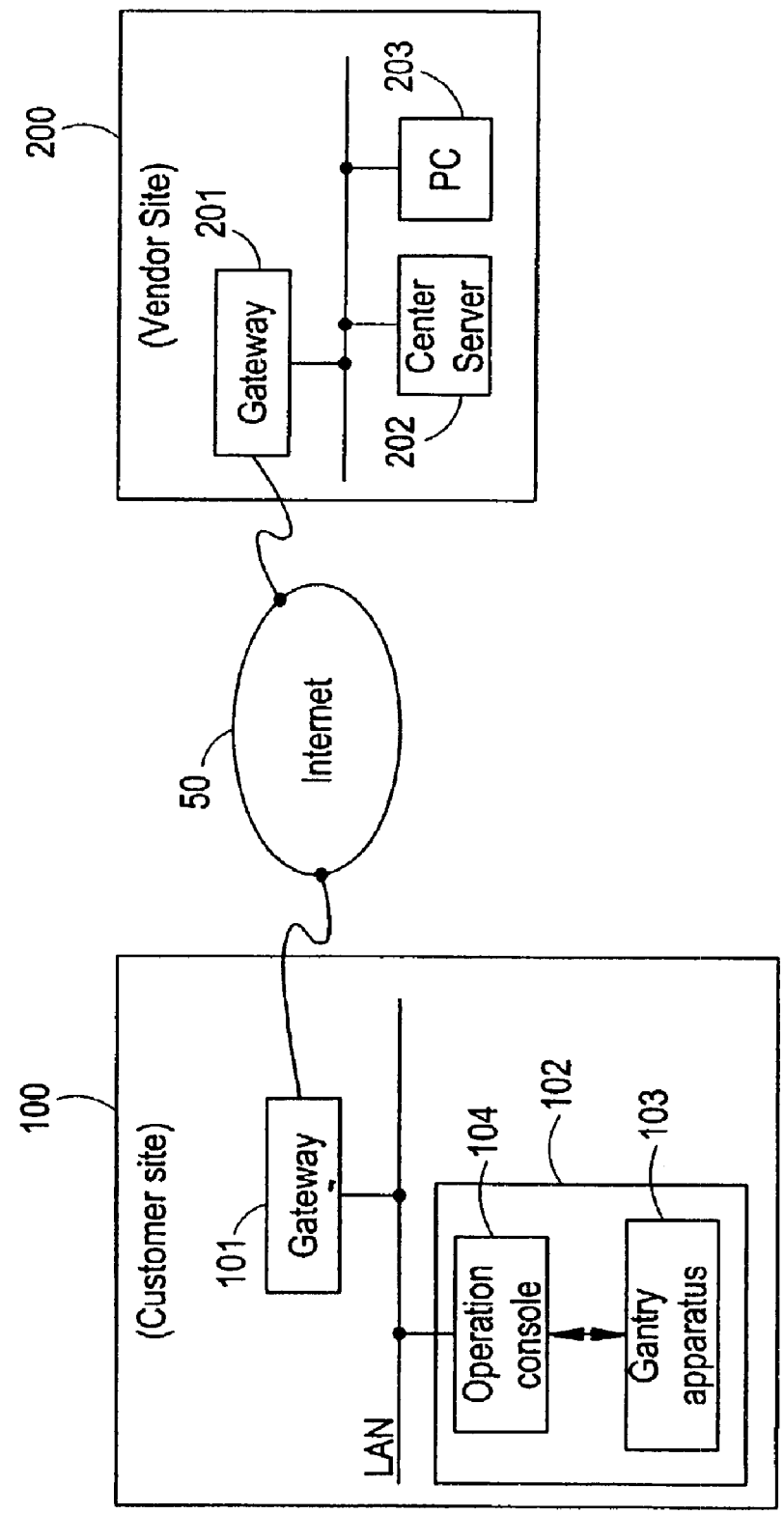
FIG. 1 is a block diagram showing a configuration of a customer site and a vendor site in accordance with an embodiment.

FIG. 1 is a block diagram showing a configuration of a customer site and a vendor site. A site (managed site) 100 of a customer that bought an X-ray system as a product and a vendor site (managing site) 200 are connected to each other via, for example, the Internet 50. It will be easily recognized that a plurality of customer sites may exist, but, for the sake of brevity of explanation, only one customer site is shown in FIG. 1.

In the customer site 100, a gateway 101 that serves as an IP router is connected to the Internet 50. The gateway 101 is connected with an X-ray CT system 102 via a LAN.

The X-ray CT system 102 is comprised of a gantry apparatus 103 that is integrally attached with an X-ray detecting mechanism for emitting X-rays onto a subject and detecting X-rays passing through the subject, and an operating console 104 for performing several kinds of operation settings for the gantry apparatus 103 and reconstructing an X-ray tomographic image based on data output from the gantry apparatus 103 for display. A general-purpose computer (including those generally referred to as a personal computer and a workstation) may serve as the operation console.

In the vendor site 200, a gateway 201 that serves as an IP router is connected to the Internet 50. The gateway 201 is connected with a center server 202 for managing customer information via a LAN. A personal computer (PC) 203 may also be connected to the LAN as a client of the center server 202, as shown.

Figure 2:
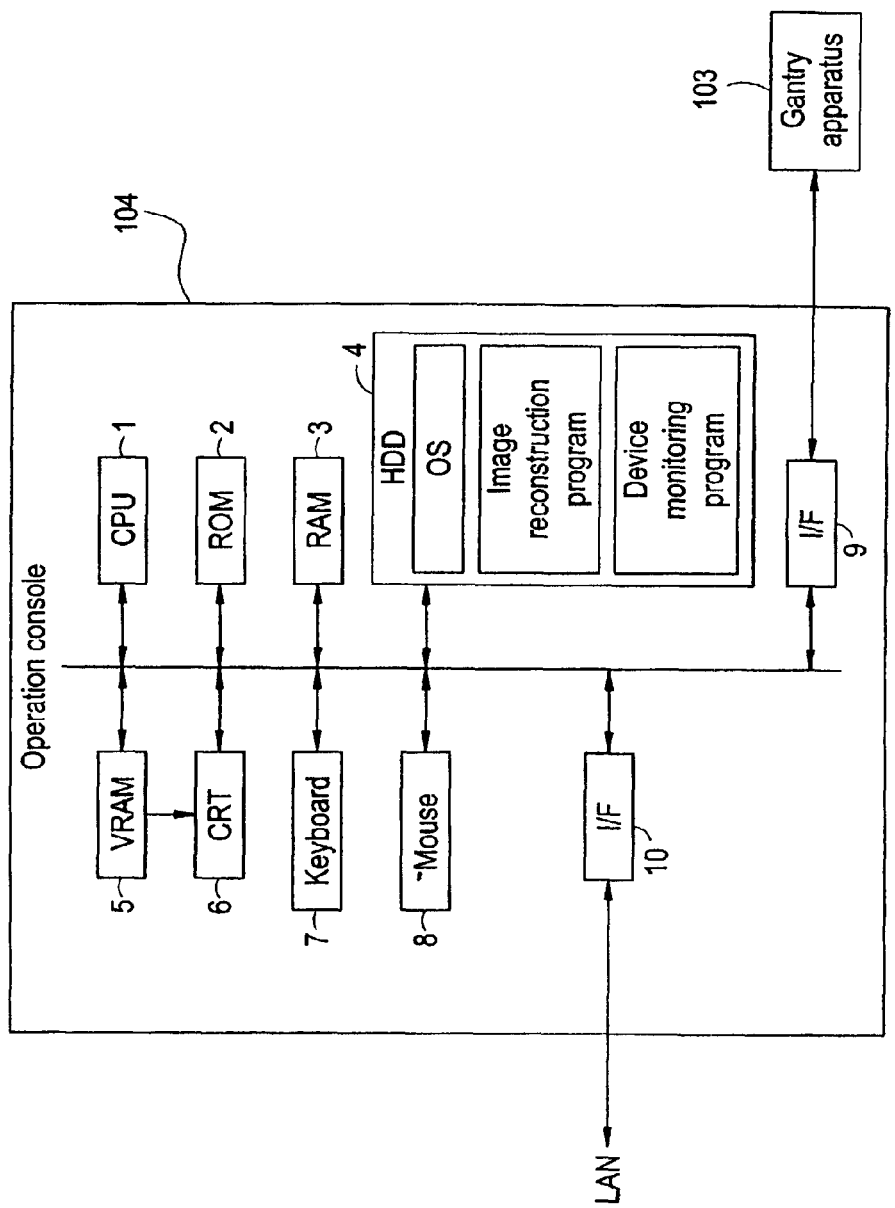
FIG. 2 is a block diagram showing the internal configuration of an operation console in the embodiment.

FIG. 2 is a block diagram showing the internal configuration of the operation console 104.

The operation console 102 comprises a CPU 1 for controlling the entire console, a ROM 2 storing a boot program etc., a RAM 3 that serves as a main storage device, and the components discussed in the following.

An HDD 4 is a hard disk device, and as shown, it stores an OS, an image reconstruction program that is an image producing program for supplying the gantry apparatus 103 with several kinds of instructions and reconstructing an X-ray tomographic image based on data received from the gantry apparatus 103, and a device monitoring program, which will be described later.

A VRAM 5 is a memory for developing image data to be displayed, and the image data can be displayed on a CRT 6 by developing the image data and the like there. Reference numerals 7 and 8 designate a keyboard and a mouse for performing several kinds of settings. Reference numeral 9 designates an interface for communicating with the gantry apparatus 103, and reference numeral 10 designates a network interface for communication via the LAN.

Figure 3:
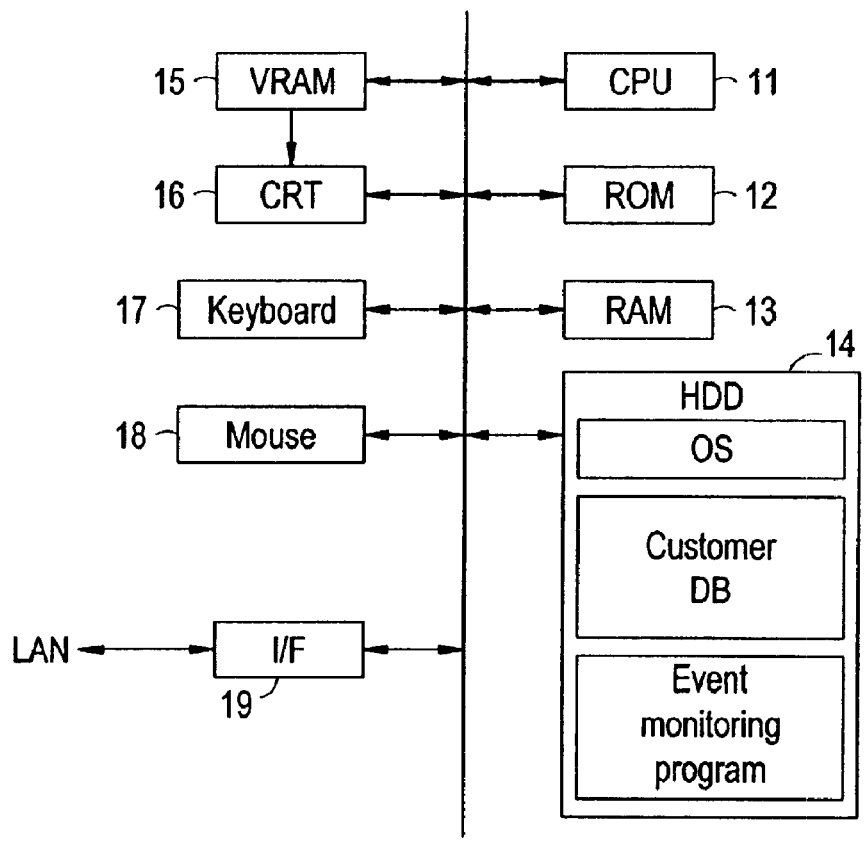
FIG. 3 is a block diagram showing the internal configuration of a center server in the embodiment.

FIG. 3 is a block diagram showing the internal configuration of the center server 202.

The center server 202 comprises a CPU 11 for controlling the entire apparatus, a ROM 12 storing a boot program etc., a RAM 13 that serves as a main storage device, and the components discussed in the following.

An HDD 14 is a hard disk device. A VRAM 15 is a memory for developing image data to be displayed, and the image data can be displayed on a CRT 16 by developing the image data and the like there. Reference numerals 17 and 18 designate a keyboard and a mouse for performing several kinds of settings. Reference numeral 19 designates a network interface for communication via the LAN.

As shown, the HDD 14 stores an OS, and a customer database containing detailed customer information. Moreover, it also stores an event monitoring program, which will be described later. The event monitoring program monitors an event issued to the center server 202 and displays the content of the received event on the CRT 16. A human manager can recognize the status of the managed site (e.g., customer site 100) by viewing the display.

The configuration of the system in the embodiment is generally as described above.

The recent dramatic improvement in computer performance has led to a situation in which the capability of the operation console remains saliently obsolete among the components of an X-ray CT system. If a system is sold only in an integrated form in such a situation, flexible maintenance services cannot be provided.

For example, when an image reconstruction program is intended to be upgraded to one of a newer version, the hardware configuration of the operation console may sometimes be already too old to adapt to the newer version. This is because the newer version has new functions incorporated, and to achieve these functions at a processing speed equal to or higher than that up to now, installation of a higher power processor and a larger storage unit etc. are usually required. In such a context, if a vendor A only provides a service scheme that compels a customer to replace the entire system with a new one, the customer incurs high costs. (However, this is a commonplace service scheme.) From the viewpoint of cost, it is preferable for the customer to replace only the operation console concerned. If the customer avoids the replacement owing to the cost burden, the customer cannot enjoy the benefit of improved system performance.

Therefore, to allow replacement of only the operation console that is a component machine of the system with new one, it is contemplated that sales and maintenance services are provided for each system component machine instead of being provided for each system. That is, the customer is directed to buy or lease a computer that serves as an operation console from another hardware distributor B. The vendor A delivers a gantry apparatus and conducts system installation including connection between the customer's computer and the gantry apparatus, and installation of an image reconstruction program into the computer.

Such a sales/maintenance service scheme allows the customer to prevent the system performance from becoming obsolete with less work and cost only for upgrade of the operation console.

When a computer that serves as an operation console is bought or leased from the other distributor B, the operation console is not covered by the maintenance services provided by the vendor A. In such a case, it may be impossible to ascertain the status of the operation console and provide timely information to the customer in accordance with the determined status.

Therefore, the device monitoring program is installed in the HDD 14 of the operation console 104 as mentioned above for implementing a function of monitoring the status of the operation console 104.

The device monitoring program is a program for monitoring several categories of operation console 104 status, and issuing an event to the center server 202 in accordance with the status. In this embodiment, the following status items are monitored, for example.

(1) Use period of the HDD 4, y

This item is monitored because a lengthy hard disk use period leads to a high risk of failure, which may reduce the reliability of the apparatus.

(2) Available capacity of the HDD 4, q

If the available capacity of a hard disk is reduced, problems occur: for example, a new version of the image reconstruction program cannot be installed; or image data generated cannot be saved.

(3) Remaining lease period, p

This item is monitored so that appropriate information can be provided to the customer according to the remaining lease period.

(4) Version of an image reconstruction program, v

This item is monitored for recommending when the image reconstruction program be upgraded to a new version.

(5) Operation frequency of the CPU 1,f

This is an index of the operation performance of the operation console. This index can be used to estimate, for example, the image processing speed by an image reconstruction program.

Figure 4:
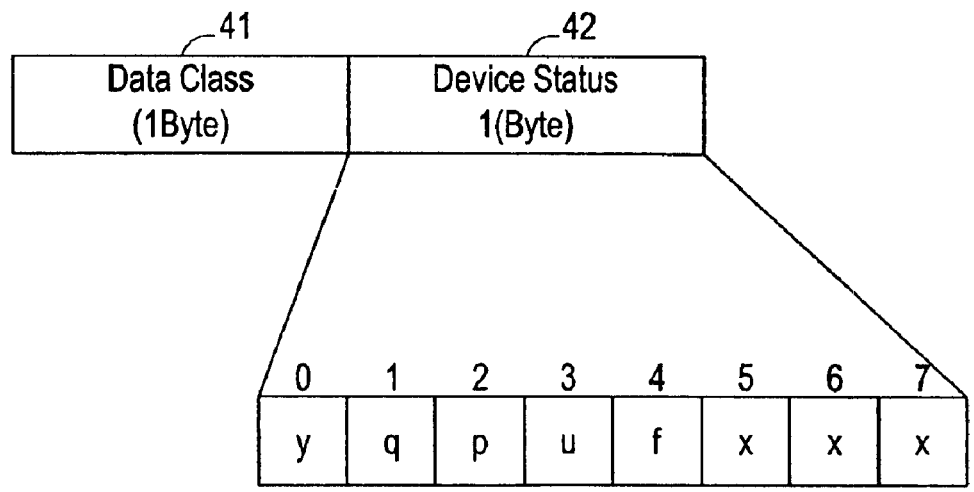
FIG. 4 shows an exemplary message format generated by executing a device monitoring program in the embodiment.

FIG. 4 is an exemplary message format generated by executing the device monitoring program.

One message contains a one-byte data class field 41 and a one-byte device status field (dsf) 42. The data class field 41 is set with a predetermined value that indicates event information. Zeroth–fourth bits of the device status field 42 are set with decision values for the status of the use period of the HDD 4, y, the residual capacity of the HDD 4, q, the remaining lease period, p, the version of the image reconstruction program, v, and the operation frequency of the CPU 1, f, respectively, for deciding whether an event should be issued to the center server 202. The remaining fifth–seventh bits are unused.

An exemplary processing procedure by the device monitoring program will be described below in detail with reference to the flow chart shown in FIG. 5. This program is loaded on the RAM 3 after power-up, and executed by the CPU 1.

In Step S1, the content of the device status field (dsf) 42 are first initialized (i.e., the bits are cleared to zero).

Next, in Step S2, necessary information is collected and stored. For example, (1) the use period of the HDD 4, y, (2) the available capacity of the HDD 4, q, (3) the remaining lease period, p, (4) the version of the image reconstruction program, v, and (5) the operation frequency of the CPU 1, f, as described above, are obtained herein. The use period of the HDD 4, y, can be obtained by, for example, calculating the number of days from the current date to a date on which a certain system file of the OS was installed in the HDD 4.

Figure 7:
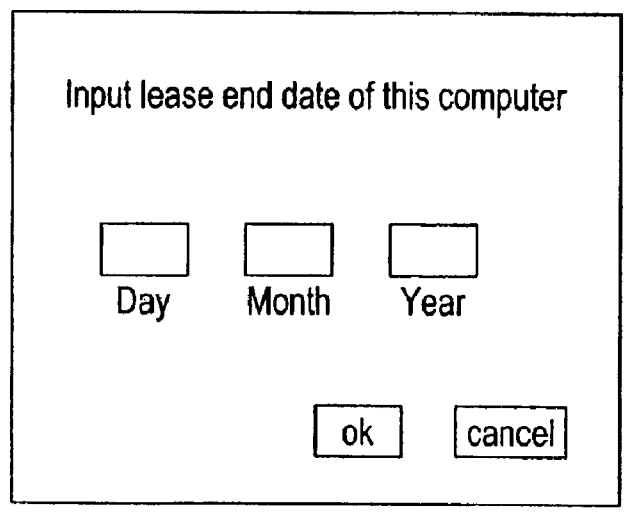
FIG. 7 is an exemplary screen display for inputting lease contract information in the embodiment.

The remaining lease period, p, is extracted from the contents of a lease contract information file stored in the HDD 4. If the lease contract information does not exist, an input screen as shown in FIG. 7 is displayed on the CRT 6, for example, and the user is prompted to input the lease end date to create a lease contract information file from the result of the input. The remaining lease period, p, can be obtained by calculating the number of days from the current date to the lease end date.

Next, in Step S3, a decision is made as to whether the use period of the HDD 4, y, is more than a predetermined period (e.g., three years). If the decision results in "yes", the process goes to Step 54; otherwise to Step S5. In Step S4, the zeroth bit dsf(0) of the device status field 42 is raised, and the process then goes to S5.

In Step S5, a decision is made as to whether the available capacity of the HDD 4, q, is less than a predetermined amount (e.g., 1 G bytes). If q is less than the predetermined amount, the process goes to Step S6; otherwise to Step S7. In Step S6, the first bit dsf(1) of the device status field 42 is raised, and the process then goes to S7.

In Step S7, a decision is made as to whether the remaining lease period, p, is less than a predetermined number of days (e.g., sixty days). If p is less than the predetermined number of days, the process goes to Step S8; otherwise to Step S9. In Step S8, the second bit dsf(2) of the device status field 42 is raised, and the process then goes to Step S9.

In Step S9, a decision is made as to whether the version of the image reconstruction program, v, is older than a predetermined version (e.g., version 3.0). If v is older than the predetermined version, the process goes to Step S10; otherwise to Step S11. In Step S10, the third bit dsf(3) of the device status field 42 is raised, and the process then goes to Step S11.

In Step S11, a decision is made as to whether the operation frequency of the CPU 1, f, is less than a predetermined value (e.g., 400 MHz). If f is less than the predetermined value, the process goes to Step S12; otherwise to Step S13. In Step S12, the fourth bit dsf(4) of the device status field 42 is raised, and the process then goes to Step S13.

Subsequently, a decision is made as to whether an event should be issued to the center server 202. In Step 513, a check is made as to whether any one of the zeroth–fourth bits of the device status field 42 is set with one. More specifically, a decision is made as to whether a logical sum of the zeroth–fourth bits, as given in the following equation, is one, that is, whether the following equation:

$$dsf(0) V\ dsf(1) V\ dsf(2) V\ dsf(3) V\ dsf(4) = 1 \text{ is satisfied.}$$

If the equation is satisfied, the process goes to Step S14, and event data having the format shown in FIG. 4 is sent to the center server 202.

Once an event has been issued to the center server 202, the decision step that relates to a device status field set with one (any one of Steps S3, 5, 7, 9, 11) may be omitted thereafter, and at the same time, that device status field may be excluded from the logical calculation in Step S13, because it is meaningless to issue an event having the same content several times.

The processing procedure of the device monitoring program is as described above.

Figure 6:
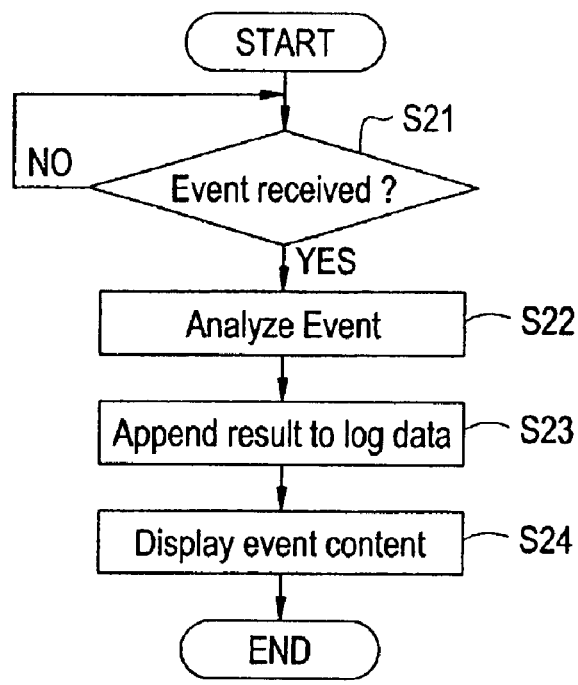
FIG. 6 is a flow chart showing an exemplary processing procedure at the center server in the embodiment.

An exemplary processing procedure at the center server 202 will next be described in detail with reference to the flow chart shown in FIG. 6. A program corresponding to this flow chart is included in the event monitoring program, and is loaded on the RAM 13 after power-up, and executed by the CPU 11.

In Step S21, transmission of an event is awaited. When an event is received, the event data is stored in the RAM 13 for the present. The process then goes to Step S22, and the received event is analyzed. Particularly, a raised bit position in the device status field 42 is checked to find out the cause of the issue of the event.

Then, in Step S23, the content of the event are logged in the customer database, and in Step S24, the content of the event are displayed on the CRT 16. They may also be displayed on the CRT 6 in the operation console 104 so that the customer and the manager of the center server 202 can share the same information.

The manager can learn the condition of the customer site 100 by viewing the display, and is enabled to provide appropriate information to the customer at an appropriate time according to the condition.

For example, upgrading the image reconstruction program even though the remaining lease period is short may be meaningless, because the operation console may be replaced with a new computer when the lease contract expires, and in this case, the installation will have to be done again. Such duplicated work is not desirable for either the vendor or the customer. According to the embodiment, the vendor can know whether the remaining lease period of the customer's operation console is short, and the vendor can decide that the upgrade should be deferred until the end of the lease contract, instead of merely advising the customer to upgrade or actually implementing the upgrade.

Besides, if it is found that the use period of the HDD 4, y, exceeds three years or the available capacity of HDD 4 is significantly small, recommendation can be made to replace the operation console 104 or expand the capacity of the storage device to maintain the reliability of the system.

Moreover, considering the available capacity of the HDD 4 or the operation frequency of the CPU 1, a decision can be made that it is more suitable to continue to use the image reconstruction program rather than upgrade.

An embodiment of the present invention has been described. While the operation console 104 issues an event to the center server 202 in accordance with the content of the management information including the lease contract information of the operation console 104 in the embodiment above, the center server 202 may first issue an event for obtaining management information to the operation console 104, and the operation console 104 may transmit the management information to the center server 202 in response to the event.

Figure 5:
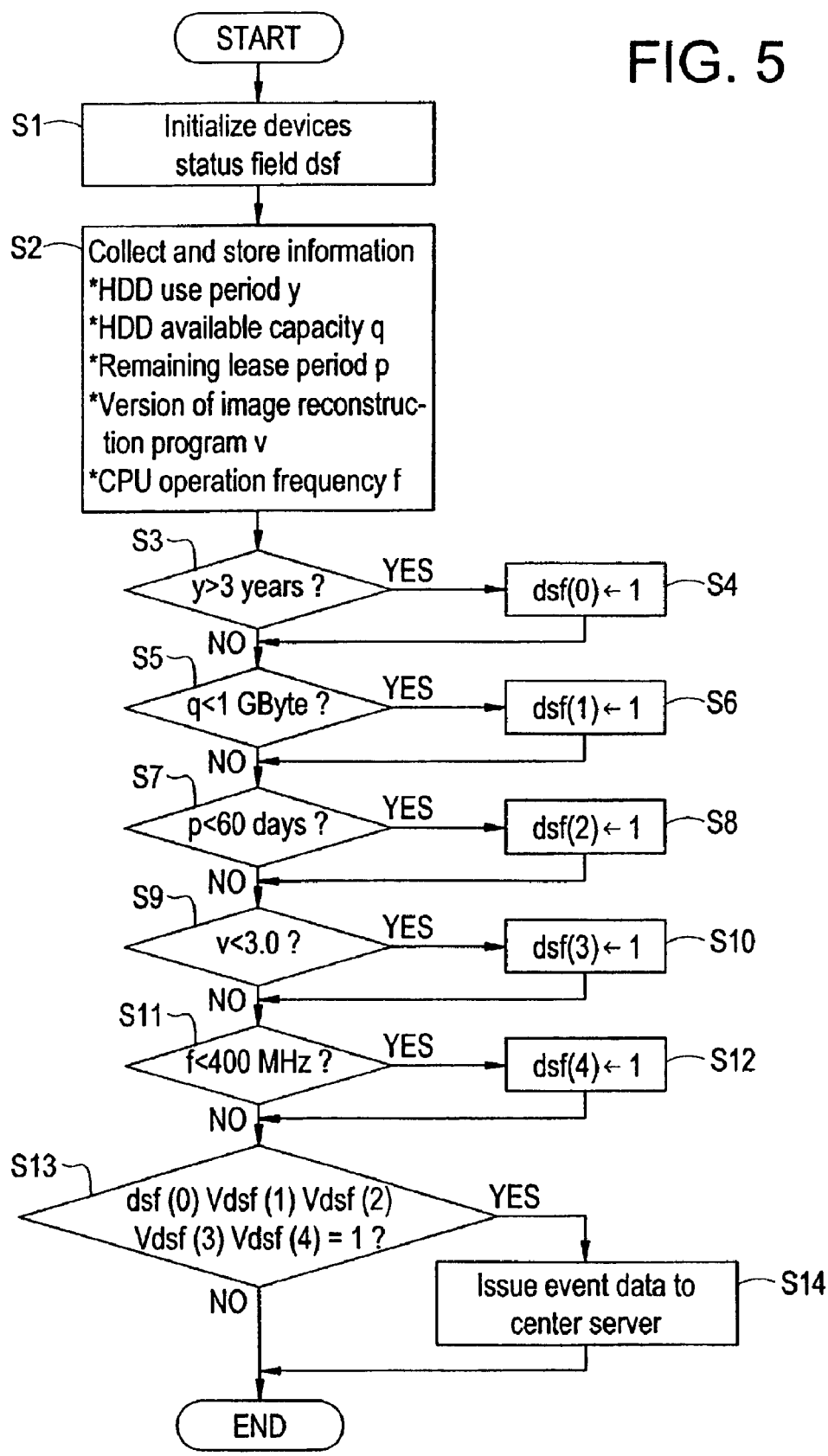
FIG. 5 is a flow chart showing an exemplary processing procedure by the device monitoring program in the embodiment.

Moreover, the analysis shown in Steps S3–S12 of the flow chart of FIG. 5 may be executed by the center server 202.

Although description of the present invention has been made assuming that a program corresponding to the flow chart shown in FIG. 5 was installed in the computer (operation console) beforehand, the present invention encompasses a program supplied from outside of the computer and read out and executed by the computer.

That is, the program per se constitutes the present invention whether it is installed in a computer or not.

Storage media usable for supplying the program include, for example, a floppy disk, hard disk, magneto-optical disk, CD-ROM, CD-R, DVD and memory card. Furthermore, instead of using these storage media, the program may be supplied by a remote computer transferring a program via a network such as the Internet.

Many widely different embodiments of the invention may be configured without departing from the spirit and the scope of the present invention. It should be understood that the present invention is not limited to the specific embodiments described in the specification, except as defined in the appended claims.

What is claimed is:

1. An operation console in a medical imaging system in communication with a center server via a network, comprising:

a management information storing device for storing management information including lease contract information of said operation console; and an event issuing device for issuing an event to said center server in accordance with content of said management information, wherein said event issuing device configured to determine whether a first cause of the event has occurred and configured to determine whether a second cause of the event has occurred if the first cause has not occurred, said operation console configured to send bits representing information regarding the first and second causes to said center server, said event issuing device configured to issue said event based on a logical sum of the bits, and said center server configured to receive a determination that a time limit associated with the second cause makes a first remedy of the first cause less useful than a second remedy of the second cause.

2. The operation console of claim 1, wherein said event issuing device comprises a device for deciding from said lease contract information included in said management information whether a remaining lease period is less than a predetermined period, and issues said event when said remaining lease period is decided to be less than said predetermined period.

3. The operation console of claim 2, wherein said event issuing device further comprises a device for deciding whether an available capacity of storage device provided in said operation console is decided to be less than a predetermined amount, and issues said event when said available capacity is less than said predetermined amount.

4. The operation console of claim 2, wherein said event issuing device further comprises a device for deciding whether a version of an imaging producing program installed in said operation console is older than a predetermined version, and issues said event when said version is decided to be older than said predetermined version.

5. The operation console of claim 2, wherein said event issuing device comprises a device for deciding whether an operation frequency of a CPU provided in said operation console is less than a predetermined value, and issues said event when said operation frequency is decided to be less than said predetermined value.

6. The operation console of claim 1, wherein said event issuing device further comprises a device for deciding whether a use period of storage device provided in said operation console exceeds a predetermined period, and issues said event when said use period is decided to exceed said predetermined period.

7. The operation console of claim 1, further comprising a notifying device for making a notice of the content of said management information.

8. A system comprising:

a server; and an operation console configured to:
  determine whether a first cause of an event has occurred;
  determine whether a second cause of the event has occurred if the first cause has not occurred;
  send bits representing information regarding the first and second causes to said server; and
  issue said event based on a logical sum of the bits, said server in communication with said operation console in a medical imaging system via a network, said server comprises:
    an analyzing device for analyzing management information including lease contract information of said operation console transmitted from said operation console; and
    a notifying device for making a notice of a result of the analysis by said analyzing device, said server configured to receive a determination that a time limit associated with the second cause makes a first remedy of the first cause less useful than a second remedy of the second cause.

9. The system of claim 8, wherein said analyzing device comprises a device for deciding from said lease contract information included in said management information whether a remaining lease period is less than a predetermined period.

10. The system of claim 9, wherein said analyzing device further comprises at least one of:

a device for deciding whether a use period of storage device provided in said operation console exceeds a predetermined period;

a device for deciding whether an available capacity of the storage device provided in said operation console is less than a predetermined amount;

a device for deciding whether a version of an imaging producing program installed in said operation console is older than a predetermined version; and a device for deciding whether an operation frequency of a Cpu provided in said operation console is less than a predetermined value.

11. The system of claim 8, wherein said analyzing device is configured to determine from the bits whether one of the first and the second causes caused the event.

12. The system of claim 8, wherein said server configured to receive a determination to implement the second remedy if it is determined that the time limit associated with the second cause makes the first remedy less useful than the second remedy.

13. A remote site management system comprising a medical imaging system including a gantry apparatus for collecting imaging data of a subject and an operation console for sending instruction signals to said gantry apparatus and producing a medical image based on the imaging data transferred from said gantry apparatus, and a center server in communication with said operation console via a network, wherein said operation console comprises:
  a management information storing device for storing management information including lease contract information of said operation console; and
  an event issuing device for issuing an event to said center server in accordance with content of said management information, wherein said event issuing device is configured to determine whether a first cause of the event has occurred, configured to determine whether a second cause of the event has occurred if the first cause has not occurred, said operation console is configured to send bits representing information regarding the first and second causes to said center server; and said event issuing device configured to issue said event based on a logical sum of the bits; and said center server comprises:
  an analyzing device for analyzing content of said event received from said operation console; and a notifying device for making a notice of the content of said event, said center server configured to receive a determination that a time limit associated with the second cause makes a first remedy of the first cause less useful than a second remedy of the second cause.

14. A system comprising:

a server; and an operation console configured to:
- determine whether a first cause of an event has occurred;
- determine whether a second cause of the event has occurred if the first cause has not occurred;
- send bits representing information regarding the first and second causes to said server; and
- logically sum the bits, said server in communication with said operation console in a medical imaging system via a network, said server comprises:
  - an analyzing device for analyzing management information including lease contract information of said operation console transmitted from said operation console; and
  - a notifying device for making a notice of a result of the analysis by said analyzing device.

15. The system of claim 14, wherein said operation console is configured to issue the event if the logical sum equals one.

16. A system comprising:

a server; and an operation console configured to:
- determine whether a first cause of an event has occurred;
- determine whether a second cause of the event has occurred if the first cause has not occurred; and
- send bits representing information regarding the first and second causes to said server, wherein a first of the bits represents that the first cause has not occurred and a second of the bits represents that the second cause has not occurred, said server in communication with said operation console in a medical imaging system via a network, said server comprises:
  - an analyzing device for analyzing management information including lease contract information of said operation console transmitted from said operation console; and
  - a notifying device for making a notice of a result of the analysis by said analyzing device.

* * * * *